Patented Sept. 13, 1927.                                    1,642,079

UNITED STATES PATENT OFFICE.

JAMES McINTOSH, OF NORRISTOWN, PENNSYLVANIA, ASSIGNOR TO DIAMOND STATE FIBRE COMPANY, OF BRIDGEPORT, PENNSYLVANIA, A CORPORATION OF DELAWARE.

SYNTHETIC RESIN AND METHOD OF MAKING SAME.

No Drawing. Original application filed August 12, 1920, Serial No. 403,126. Divided and this application filed February 20, 1925. Serial No. 10,688.

My invention relates to that class of condensation products using phenol or one of its homologues, and this application is a division of the application filed by me, James McIntosh, and Edwin Yeakle Wolford, on August 12, 1920, Serial No. 403,126.

It is also desired to provide a synthetic resin which shall be inexpensive and easy to make, whose nature shall be such as to fit it for use as a shellac substitute, as a molding compound, as a water-proofing agent for impregnating sheet, tube and rod material, made of paper, woven or felted fabric, parchmentized fibre and for the many other uses requiring a hard relatively infusible, insoluble and structurally strong, light, tough substance.

Another object of the invention is to provide a synthetic resin of the above class which shall be available for use as a non-conductor of high dielectric value, which shall be water and oil proof and which may be prepared in soluble or insoluble form at will, being, when in soluble form, capable of further treatment whereby it may be changed at will into its insoluble and infusible form.

I also desire to provide a condensation product which in its initial stage or form may be utilized in connection with suitable powdered or fibrous material as a substance from which articles may be subsequently molded under heat and pressure in order to transform said product to its final solid and infusible form.

It is fruther desired to provide a relatively simple, inexpensive and easily operated process utilizing glycerine or glycerine derivatives for making products of the above class.

In carrying out my invention in a typical case, I prepare a mixture of one hundred grams of phenol or one of its homologues and ninety to one hundred grams of glycerine or one of the derivatives of glycerine, such as epichlorhydrin, allyl alcohol, glycerine aldehyde, di-hydroxy-acetone, etc., with a suitable catalytic agent, such as about twenty drops of sulphuric acid in the case specified, or 40 drops of bromine.

The above mixture is then boiled from six to eight hours under a reflux condenser, at the end of which time the resulting liquid is transferred to an oven and subjected to a temperature of about 125° C. for further condensation. If this heating in the oven be stopped at the end of four or five hours, the material constitutes an initial condensation product and is soluble in alcohol, acetone, benzol and other ordinary organic solvents such as those above noted and is fusible at elevated temperatures.

When subjected to further condensation by being heated to a temperature of about 125° C. for a period of about twenty-four hours, the initial product will change to its solid form in which it is infusible at all temperatures and insoluble in the ordinary organic solvents such as those above noted.

In either its initial or final form the above described condensation product of a phenolic body and glycerine or a glycerine derivative may be employed for any of the purposes for which other phenolic condensation products are now utilized, being especially valuable as a shellac substitute. When in the initial or semi-solid stage it may be employed as a base in the manufacture of varnish and may be used for the impregnation of vulcanized fibre, paper or fabrics in sheet, tube, block or rod form, after which upon the application of suitable heat such as that resulting from 125 pounds steam pressure and a pressure of about one thousand pounds per square inch, for from one to five hours or more, depending upon the dimensions and form of the structure, it may be caused to change to its final or solid form.

In making a laminated structure such as a block, sheet tube, or rod, the above condensation product in its liquid or semi-solid initial stage is dissolved in from fifty to sixty parts of an organic solvent such as alcohol or acetone and is caused to uniformly permeate the sheet or other fibrous or porous body either by directly soaking the latter in said liquid or by any other known method. After the solvent has been removed by heating in an oven or dry house, the impregnated sheets or other structures may be subjected to relatively high pressure such as one thousand pounds to the square inch and to a temperature such as that of steam at one hundred and twenty-five pounds pressure for a period depending upon the thickness and dimensions of said material. Tubes or rods may be made from the above described impregnated sheet material by winding it on a mandrel of suitable dimensions and thereafter subjecting it to heat and pressure such as above indicated.

In any case the resulting product is unaffected by moisture and by the ordinary organic solvents, it has a high mechanical strength, and is especially adapted for mechanical and electrical purposes, being particularly useful in the manufacture of gears, electrical insulators, phonograph records, etc.

Without departing from my invention, I may vary the proportions of the glycerine or glycerine derivative and of the phenolic body employed therewith and I may also vary the temperatures, pressures and time of treatment,—the essential feature of the invention residing in the production of a condensation product constituting a synthetic resin by utilization of a phenolic body and glycerine or derivative thereof as described above. In place of phenol, I may employ any of its homologues such as o-, m-, p-cresol, or any compound containing a hydroxyl radical joined to a benzene ring, substituted or not.

While the condensation product in its initial stage is a liquid or semi-liquid soluble in acetone, alcohol, benzol, etc., in its final form it is infusible and insoluble in the above noted and other ordinary organic solvents, being a hard, tough, resinous substance, breaking with a lustrous fracture and having a dense, homogeneous structure.

As typical of catalytic agents which may be employed in place of sulphuric acid, I may use bromine, pyridine, sulphur monochloride, aniline hydrochloride, other acids as hydrochloric; bases, as ammonia, acid salts; as sodium bisulphate; and other compounds.

Certain catalysts, I find, for certain uses, cause deleterious effects on the materials with which my condensation product is used, and the removal of the catalyst may therefore be desirable. The catalysts may be removed by simply washing out with water or any other suitable solvent in which the resin or condensation product is insoluble. This removal by a purely physical method, is best performed after the first fusible and soluble condensation product is formed, as heat alone without catalytic assistance will cause the condensation to become total and give a hard infusible, insoluble product.

If the introduction of water or other solvent as mentioned above is not desirable, the catalyst may be removed by chemical means, i. e., introducing some substance, inert in itself towards the materials which the catalyst destroys but reactive with the catalyst, forming a non-reactive or inert substance which in small quantity does not affect the desirable properties of the condensation product.

The chemical removal of the catalyst takes place best after the first fusible and soluble product is formed, as heat alone can carry the condensation to the final stage.

For instance, if sulphuric acid is to be removed, I add a powdered barium carbonate in excess. This latter is inert and the barium sulphate formed may act as a filler.

If bromine is to be removed, I add an alcoholic solution of ammonia, and the ammonium bromide which is chiefly formed, is inert.

If cresol be employed in place of phenol, I employ it in the proportion of one hundred and twenty parts to one hundred parts of glycerine, while if epichlorhydrin is used in place of glycerine, I employ it with an equal amount of phenol or in the proportion of six parts cresol to five parts epichlorhydrin.

When in its initial stage, my condensation product may be dissolved in alcohol, acetone, benzene, etc., and thereafter be mixed with wood flour, asbestos or other organic or inorganic material, after which the solvent may be removed by heat. The resulting mass may be then ground or otherwise reduced to a powder which may be readily given any desired form by subjecting it while in a mold to a pressure of approximately one thousand pounds to the square inch at a temperature equivalent to that of steam at a pressure of one hundred and twenty-five pounds per square inch, for a period of time depending upon the dimensions and form of the object being molded;—the pressure and heat being continued in any case until the condensation product has assumed its final infusible and solid form.

Inasmuch as my invention contemplates the use of glycerine derivatives such as noted above, as well as gylcerine itself, it is to be understood that in the claims the term gylcerine is intended to broadly cover and include both the chemical substance known as glycerine and also the derivatives thereof.

I claim:

1. A condensation product resulting from the reaction of a phenolic body and glycerine, consisting of a dense, homogeneous solid infusible at all temperatures and insoluble in alcohol, acetone, benzol and other ordinary organic solvents.

2. An initial condensation product resulting from the reaction of a phenolic body and glycerine and consisting of a liquid soluble in alcohol, acetone and benzol and capable of being further condensed and solidified by heating.

3. The method which consists in mixing glycerine, a phenolic body and a catalytic agent; heating said mixture to cause said substances to react; and arresting the reaction when there has been formed a solid, infusible mass which is insoluble in alcohol, benzol, acetone, etc.

4. The method which consists in causing a phenolic body and glycerine to react to form an initial resinous condensation product capable of being further condensed and solidified by heating.

5. As a new composition of matter, a potentially reactive condensation product of a phenol and a polyhydric alcohol.

6. As a new composition of matter, a potentially reactive condensation product of a phenol and glycerol.

7. A process which comprises heating together glycerine and a phenol in the presence of an acid catalyst until there is formed an initial condensation product; neutralizing said product; and thereafter heating the same until there is formed a hard, infusible, insoluble resin.

8. A process of making a synthetic resin which comprises causing a phenolic body and glycerine to form an initial condensation product; dissolving said product in an organic solvent; and heating the same until there is formed an insoluble, infusible resin.

9. The method which comprises causing glycerine and a phenolic body to react to form an initial condensation product, and further heating the same until there is formed a hard, infusible, insoluble resin.

10. A hard, infusible, insoluble synthetic resin resulting from the further heating of the initial condensation product obtained by reacting a phenol and glycerine.

JAMES McINTOSH.